(12) United States Patent
Mountz

(10) Patent No.: US 10,176,349 B1
(45) Date of Patent: Jan. 8, 2019

(54) INDOOR POSITION AND VECTOR TRACKING SYSTEM AND METHOD

(71) Applicant: Kacchip, LLC, Lexington, MA (US)

(72) Inventor: Michael C. Mountz, Lexington, MA (US)

(73) Assignee: Kacchip, LLC, Lexington, MA (US)

( * ) Notice: Subject to any disclaimer, the term of this patent is extended or adjusted under 35 U.S.C. 154(b) by 0 days.

(21) Appl. No.: 15/835,021

(22) Filed: Dec. 7, 2017

(51) Int. Cl.
*G06F 17/00* (2006.01)
*G06K 7/10* (2006.01)
*G06K 19/077* (2006.01)

(52) U.S. Cl.
CPC ... *G06K 7/10366* (2013.01); *G06K 19/07758* (2013.01)

(58) Field of Classification Search
CPC ....... G06Q 30/02; G07F 7/1008; G06K 17/00
USPC .......................................................... 235/375
See application file for complete search history.

(56) References Cited

U.S. PATENT DOCUMENTS

| | | | | |
|---|---|---|---|---|
| 9,924,244 B2* | 3/2018 | Sadr | ......................... | H04Q 9/00 |
| 2005/0280574 A1* | 12/2005 | Tafas | ...................... | B01L 3/545 |
| | | | | 342/126 |
| 2008/0239478 A1* | 10/2008 | Tafas | ............... | G01N 35/00732 |
| | | | | 359/396 |
| 2012/0127976 A1* | 5/2012 | Lin | ......................... | G01S 13/82 |
| | | | | 370/338 |

OTHER PUBLICATIONS

Kuang, Cliff, "How the Gurus Behind Disney's MagicBand are Remaking a $38B Cruise Giant," CO. Design, Jan. 4, 2017, https://www.fastcodesign.com/3066933/how-the-minds-behind-disneys-magicband-are-remaking-a-38b-cruise-giant, 12 pages.
The Million Dollar Home of Bill Gates, Mar. 5, 2014, https://www.therichest.com/luxury/celebrity-home/the-million-dollar-home-of-bill-gates/, 7 pages.
Elkhouly, Essam Abdelkadir, "UWB Precise Indoor Localization System Performance, Limitations and its Integration." PhD diss., University of Tennessee, 2014, http://trace.tennessee.edu/utk_graddiss/3121.
Wang et al., "A Review of Wearable Technologies for Elderly Care the Can Accurately Track Indoor Position, Recognize Physical Activities and Monitor Viatal Signs in Real Time," Sensors 2017, 17(2), 341, 36 pages, MDPI AG, and Basel, Switzerland.
Connell, Ciaran, "What's the Difference Between Measuring Location by UWB, Wi-Fi, and Bluetooth?", Feb. 6, 2015, http://www.electronicdesign.com/communications/what-s-difference-between-measuring-location-uwb-wi-fi-and-bluetooth, 10 pages.
DecaWave, Product Infromation: DW1000, Technical Data, 2013, 2 pages.
DecaWave, Application Note: APS003, Introduction to Real Time Location Systems, 2014, 14 pages.

* cited by examiner

*Primary Examiner* — Ahshik Kim
(74) *Attorney, Agent, or Firm* — Baker Botts L.L.P.

(57) ABSTRACT

A control system for indoor position and vector tracking includes a plurality of radio frequency (RF) transmitters to detect a mobile radio frequency identification (RFID) tag. The control system includes an intelligent controller to receive location information from the RF transmitters and to calculate a vector associated with the mobile RFID tag. The intelligent controller may utilize the vector as a control input to an algorithm for selecting a control operation for one or more of plurality of networked devices.

20 Claims, 6 Drawing Sheets

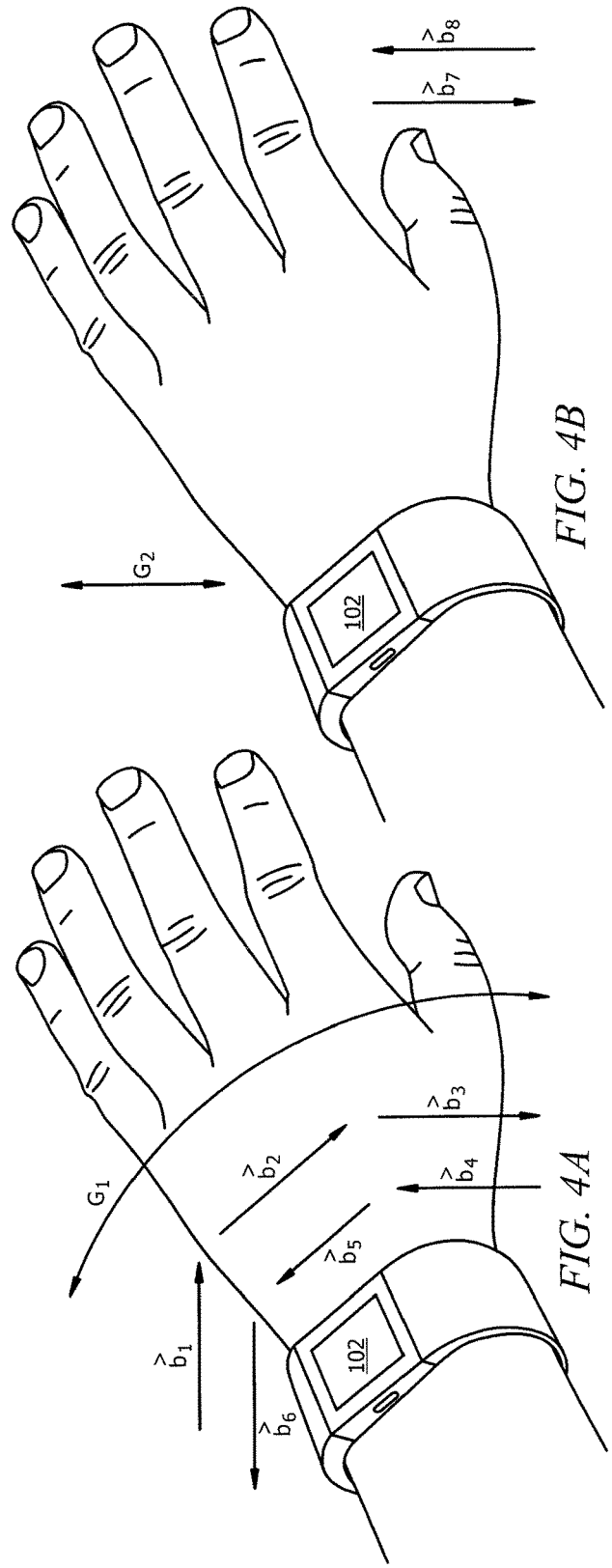
FIG. 4B
FIG. 4A
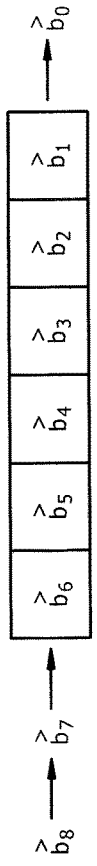
FIG. 4C

US 10,176,349 B1

INDOOR POSITION AND VECTOR TRACKING SYSTEM AND METHOD

TECHNICAL FIELD OF THE INVENTION

The invention relates in general to control systems, and more particularly to a system and method for using an indoor position and vector tracking system and method to improve the operation of home automation systems.

BACKGROUND OF THE INVENTION

Home automation systems attempt to serve occupants of a home by automating routine tasks, such as activating lighting or regulating temperature within the home. To date, however, home automation systems have utilized rudimentary control mechanisms for feedback and control that cannot fully tailor the performance of the home automation system to the unique needs of the occupants.

SUMMARY OF THE INVENTION

In accordance with the teachings of the present disclosure, disadvantages and problems associated with home automation systems have been substantially reduced or eliminated. In particular, an indoor position and vector tracking system and method provides substantial improvements in home automation technology.

In accordance with another embodiment of the present disclosure, a system for position tracking includes anchors positioned in an indoor space, where the anchors represent a plurality of radio frequency transmitters each operable to transmit a radio-frequency (RF) waveform. The system also includes a wearable mobile radio frequency identification (RFID) tag responsive to the RF waveform, an intelligent controller connected to the anchors, and a networked device. The intelligent controller is operable to receive, from the anchors, a first position data corresponding to a first detection of the wearable mobile RFID tag and receive, from the plurality of anchors, a second position data corresponding to the second detection of the wearable mobile RFID tag. The intelligent controller is operable to calculate, from the first position data and the second position data, a personal motion vector of the mobile RFID tag, the personal motion vector representing at least one of (1) a location and direction of movement or (2) a gesture of the mobile RFID tag. The intelligent controller is further operable to associate the wearable RFID tag with a unique identity, select an operation with respect to the networked device based at least on the personal motion vector and the unique identity, and transmit a control instruction to the networked device operable to cause the selected operation on the networked device.

In accordance with one embodiment of the present disclosure, a method for indoor position and vector tracking includes receiving, by an intelligent controller, position data from one or more anchors positioned in an indoor space, wherein the anchors comprise radio frequency transmitters operable to transmit an RF waveform and the position data corresponds to detections of a wearable mobile radio frequency identification (RFID) tag using the RF waveform. The method further includes, calculating, based on the position data, a personal motion vector of the mobile RFID tag, where the personal motion vector represents (1) a location and direction of movement or (2) a gesture of the mobile RFID tag. The method further includes associating the wearable RFID tag with a unique identity, selecting an operation with respect to a networked device based at least on the personal motion vector and the unique identity, and transmitting a control instruction to the networked device operable to cause the selected operation on the networked device.

Technical advantages of certain embodiments of the present invention include an improved control system that can detect and take into account the personal motion vectors of wearable tags when making control decisions. By improving the feedback and control mechanisms of the home automation system, including improving the technology within an intelligent controller, various other benefits can be achieved. Other technical advantages of the present disclosure will be readily apparent to one of ordinary skill in the art from the following figures, description, and claims. Moreover, while specific advantages have been explained above, various embodiments may include some, all, or none of those advantages.

BRIEF DESCRIPTION OF THE DRAWINGS

For a more complete understanding of the present invention and its features and advantages, reference is now made to the following description, taken in conjunction with the accompanying drawings, in which:

FIGS. 4A and 4B are perspective drawings illustrating example gestures for home automation control in accordance with the teachings of the present disclosure;

FIG. 4C is an illustration of an example embodiment of detecting a gesture;

DETAILED DESCRIPTION OF THE INVENTION

Figure 1:
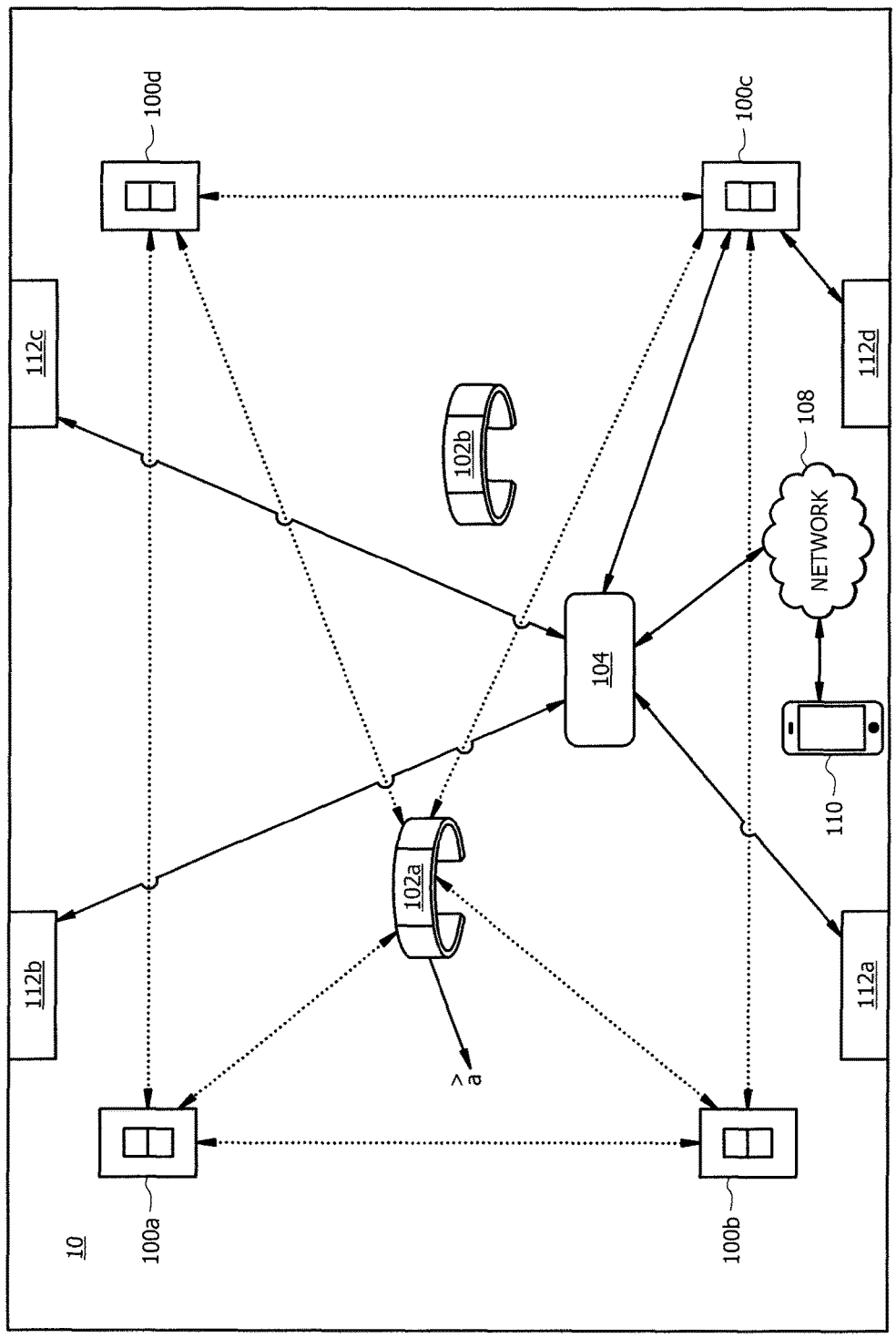
FIG. 1 is a block diagram illustrating an example embodiment of a system for home automation in accordance with the teachings of the present disclosure.

Embodiments of the present disclosure and its advantages are best understood by referring to FIGS. 1 through 6, wherein like numerals refer to like and corresponding parts of the various drawings.

Traditional environments like the home are faced with an ever-increasing number of automated devices and appliances, yet the sophistication of home automation systems has historically lagged behind other industries. Yet, in recent years, the number of connected Internet of Things (IoT) devices and appliances available to the consumer is increasing. These devices and appliances serve the occupant by receiving sensor input and taking action based on that input. For example, motion detectors may turn on the light if motion is detected. These basic control mechanisms suffer from a number of deficiencies. Using the previous example, if the occupant remains still for too long (or is situated outside of the line-of-sight of the motion sensor), a timer may cause the light to turn off even if the occupant is still in the room and would like the light to stay on. These basic controllers lack the mechanisms required to know where the individual is, know whether an individual wants to turn on the light when entering a room, or, to use another example, know whether the individual wants to raise or lower the temperature setting of the home air conditioning system without receiving a direct command to do so by the individual. Specifically, these mechanisms also lack the ability to distinguish between individuals that may want different actions taken, and they lack the ability to determine the direction of travel of those individuals within the room that would be used to determine which action to take.

The present disclosure recognizes that such systems lack mechanisms to determine who is in the home, where in the room they are, and in what direction and with what velocity they are currently moving. In order to provide a home automation system that remedies these and other deficiencies, the present disclosure recognizes that improved control mechanisms are required in order to track and use this information it its control algorithms. For example, the present disclosure recognizes and discloses mechanisms for obtaining and calculating the personal motion vectors of individual home occupants, as well as sophisticated control algorithms that may utilize and/or learn the preferences of the individual occupant based on the personal motion vectors. Anchors located at various points around the home may utilize radio frequency technology, such as UWB, to calculate the location of a radio frequency identifier that the occupant of the home may wear. The wearable tag may be conveniently embodied as a wristband or necklace, or could be included within a smart watch or similar device. The position data associated with the wearable tags may be successively analyzed to calculate personal motion vectors associated with the wearers of the wearable tags. These personal motion vectors reveal the location and direction of movement of the occupant, and can be further calculated to detect precise gestures the occupant is making. This information can be utilized as an input to empower control algorithms that may learn user's preferences by observing the personal motion vectors and associating those vectors with preferred control activities, and to take actions with respect to a network of IoT and other devices.

FIG. 1 is a block diagram illustrating an example embodiment of a control system 10 for home automation in accordance with the teachings of the present disclosure. Control system 10 includes multiple anchors 100a . . . 100d (which may individually or collectively be referred to herein as anchor(s) 100), one or more wearable tags 102a . . . 102b (which may individually or collectively be referred to herein as wearable tag(s) 102), intelligent controller 104, network 108, user equipment device (UE) 110, and networked devices 112a . . . 112d (which may individually or collectively be referred to herein as networked device(s) 112).

Control system 10 may comprise one or more rooms of a home, office, or other indoor space that includes various networked devices 112 under the control of intelligent controller 104. Anchors 100 collectively detect position data of one or more wearable tags 102 and transmit the position data to intelligent controller 104. Intelligent controller 104 uses the position data to determine a location and personal motion vectors of the one or more wearable tags 102 (such as vector $\vec{a}$ with respect to wearable tag 102a). The identity of the wearer of wearable tag 102 and the personal motion vector of wearable tag 102 may be used as inputs to directly control a device and/or as inputs to a predictive and/or learning algorithm for controlling one or more networked devices 112. Using the identity of the wearers of wearable tags 102 as well as their respective personal motion vectors the home automation system 10 can more finely tailor its control of networked devices 112 to the precise needs and preferences of the individual occupants.

Anchors 100 comprise a wireless transceiver module coupled to an appropriate antenna capable of transmitting and receiving a radio frequency (RF) pulse to locate the position of wearable tags 102. Anchors 100 may triangulate a two or three-dimensional location of wearable tag 102 by measuring the time of flight (ToF) of RF signals emitted and/or reflected from wearable tag 102 to calculate position of wearable tag 102. Additionally or alternatively, wearable tag 102 may measure the ToF of signals received from various anchors 100 and transmit position data to anchors 100. The time distance of arrival (TDOA) of the RF signals to the various anchors 100 or to wearable tag 102 may be utilized to calculate the precise location of wearable tag 102 using triangulation. This calculation may be performed by wearable tag 102 or one or more of anchors 100. It should be noted that while anchors 100a . . . 100d are shown in the illustrated embodiment, system 10 may include any appropriate number of anchors as required. For example, subsets of anchors 100 may be utilized in each room of the indoor space to sufficiently triangulate wearable tags 102 within each room.

In some embodiments, anchors 100 and/or wearable tag 102 may utilize an orthogonal frequency division multiplexed (OFDM) modulation scheme to transmit and/or receive ultra-wideband (UWB) signal RF pulses. UWB is radio technology that may use low energy signals in the range of −41.3 dBm/MHz for short pulses of 1 to 100 megapulses per second on a wide frequency carrier signal (3.1-10.6 GHz). In some embodiments, UWB may be beneficially utilized by anchors 100 and/or wearable tags 102 to detect the position of wearable tags 102 in two- or three-dimensional space within a 5-10 cm margin of error 1-10 times every second. In some embodiments, anchors 100 may include a second wireless transceiver module to communicate ToF and/or TDOA data to each other and/or position data of wearable tag 102 to intelligent controller 104. Position data may comprise {x, y, and z} coordinates of wearable tag 102, an identity of wearable tag 102, along with a timestamp representing a time at which wearable tag 102 is located at those coordinates. It should be understood that the coordinates provided by anchors 100 may not necessarily be absolute locations. In some embodiments, the coordinates reported by anchors 100 may be relative values from some particular starting location, and/or values relative to each other. For example, one anchor 100a may arbitrarily be set to have coordinates of {0, 0, 0} and other anchors 100 and devices may be determined relative to the location of anchor 100a. It should also be noted that while UWB has been described with respect to the first wireless module of anchors 100, any appropriate indoor positioning technology may be utilized (such as Wi-Fi, RFID, ultrasound, or GPS) to the extent that it can provide sufficient location resolution of wearable tags 102. The second wireless module may utilize a wireless protocol such as Wi-Fi, infrared, or Bluetooth, or other suitable wireless protocol to communicate position data to intelligent controller 104. In some embodiments, anchors 100 may form a mesh network.

Wearable tags 102 comprise a locator tag capable of emitting RF signals to anchors 100. Wearable tags 102 may comprise a radio-frequency identifier (RFID) tag, in which wearable tags may include a reflector of RF signals received from anchors 100. Wearable tag 102 may be capable of modulating the reflected signal such that anchors 100 are capable of interpreting the modulated signal as a unique identifier of the wearable tag 102. Alternatively, wearable tag 102 may include a transceiver module capable of receiving various RF signals from anchors 100 and transmitting position data to one or more anchors 100. In such embodiments, wearable tags 102 may include circuitry for measuring TDOA of RF signals from anchors 100 and using TDOA to triangulate three-dimensional coordinates of wearable tag 102. In response to receiving synchronized RF pulses from anchors 100, wearable tag 102 may respond by transmitting position data to one or more anchors 100. In some embodiments, wearable tag 102 may act as a reflector of RF pulses from anchors 100, and in such embodiments, anchors 100 may be responsible for generating position data for transmission to intelligent controller 104. Wearable tag 102 may comprise or be embedded in a wearable accessory, such as a watch, wristband, or necklace. In some embodiments, wearable tag 102 may be included in, on, or as part of a smart watch. Notably, wearable tag 102 and/or anchors 100 may be capable of operating in a discontinuous reception mode (DRX) in which signals from anchors 100 may be discontinued at appropriate times and/or intervals. For example, a DRX mode may be triggered upon a determination that the coordinates of wearable tag 102 are not substantially changing (i.e., wearable tag 102 is generally stationary). The DRX mode may then cause anchors 100 and/or wearable tag 102 to transmit/emit RF signals on a longer cycle than when wearable tag 102 is actively moving. DRX mode may be disabled upon a detection that the coordinates of wearable tag 102 have changed.

Intelligent controller 104 comprises a centralized feedback-based controller capable of receiving position data of one or more wearable tags 102 within system 10 and calculating personal motion vector $\bar{a}$ of wearable tag 102 and for controlling the operation of one or more network devices 112 within system 10. For example, in the illustrated embodiment, personal motion vector $\bar{a}$ may comprise position data (x, y, and/or z coordinates) of wearable tag 102a and direction of movement of wearable tag 102a. In some embodiments personal motion vector $\bar{a}$ may also comprise the velocity of the wearable tag 102a. Intelligent controller 104 may be capable of interpreting personal motion vector $\bar{a}$ as a direction of movement of the user of wearable tag 102. Personal motion vector $\bar{a}$ may additionally or alternatively indicate a motion state of wearable tag 102a. For example, a personal motion vector $\bar{a}$ with a velocity of zero may indicate a lack of movement or activity of wearable tag 102a. Intelligent controller 104 may also be capable of calculating personal motion vectors of wearable tag 102b and any number of additional wearable tags 102 at once and/or in parallel with wearable tag 102a. Intelligent controller 104 may include or comprise a programmable logic controller, application specific integrated circuit (ASIC), field programmable gate array (FPGA), and/or computer processor, along with one or more memories and controlling logic. Intelligent controller 104 may include control logic implemented in a non-transitory computer-readable medium. Intelligent controller 104 includes one or more feedback-based control algorithms for utilizing the unique identity associated with wearable tag 10, personal motion vectors of wearable tags 102, the status of networked devices 112, and other appropriate intelligence to make intelligent decisions about the operation of networked devices 112.

Intelligent controller 104 may additionally or alternatively be capable of interpreting one or more personal motion vectors as a gesture from a particular user of a wearable tag 102. Intelligent controller 104 may include pattern-recognition logic to interpret a set of personal motion vectors as a gesture. Gestures may be utilized by intelligent control hub to initiate a control operation of one or more networked devices 112. Additionally or alternatively, gestures may be used by intelligent controller 104 as feedback on the operation of one or more networked devices by intelligent controller 104. As another example, intelligent controller 104 may include training logic to learn the location of various devices 112 based on gesture-based feedback. The gesture-based feedback may also be used as input to an artificial intelligence algorithm that can update and learn user preferences for device 112 settings. For example, if the intelligent controller 104 determines to activate a light based on the presence of wearable tag 102 moving toward a particular room, a gesture may be utilized as an instruction to intelligent controller 104 that the user does not want the light activated. Intelligent controller 104 may record the circumstances (context) under which the light activation feedback was provided, such as time of day, time of year, and/or the location of other wearable tags 102. Those circumstances may be utilized to update the preference profile of the user of wearable tag 102 and/or to update a predictive control algorithm of intelligent controller 104. For example, intelligent controller 104 may learn over time based on the circumstances that the user of wearable tag 102 prefers to not turn on the hallway light at night when other wearable tags 102 of children are present in the adjacent rooms, but prefers to turn on the hallway light if the children are not present in the adjacent rooms. Additional example embodiments of feed-back control algorithms utilized by intelligent controller 104 will be explained below with respect to an example embodiment of operation of intelligent controller 104. A more detailed embodiment of intelligent control hub is explained below with respect to FIG. 2. Example embodiments of how intelligent controller 104 may interpret a set of personal motion vectors as gestures are explained below with respect to FIG. 3.

Network 108 comprises any appropriate combination of hubs, switches, routers, and associated signaling that may allow a UE 110, such as a smart phone or table, to communicate with intelligent controller 104 using network 108. Network 108 may represent a home network (such as a Wi-Fi network) and/or may include the Internet.

UE 110 comprises any device capable of displaying an interface and communicating data to and from intelligent controller 104 utilizing network 108. In some embodiments, a UE may comprise a smart phone or tablet that includes an application interface (such as a smart phone app) to interact with intelligent control hub 108. A UE 110 may utilize network 108, for example, to interact with intelligent control hub 108 in order to configure network devices 112, set up user profiles associated with wearable tags 102, enter preference data to be associated with the user profiles, and/or enter data about the layout of the devices 112 within system 10.

Networked devices 112 comprise networked devices that are connectable to intelligent controller 104, such as IoT devices. Networked devices 112 may include any device that includes a transmission module to receive commands and/or signals from intelligent controller 104 and logic or circuitry to take appropriate action based on those signals and/or commands. Network devices 112 may communicate with intelligent controller 104 using one or more of any appropriate communication protocols, such as Wi-Fi, control area network (CAN), Bluetooth, infrared, X10, or other wired or wireless protocols. Networked devices 112 may include lighting and/or lighting control modules, automated window and door locks, security systems, video surveillance systems, air conditioning and heating systems and/or thermostats (including smart thermostats), refrigerators, garage doors, air purifiers, humidifiers, or other household or office appliances connectable to intelligent controller 104 and capable of responding to commands or signals from intelligent controller 104 by taking appropriate action. In some embodiments, one or more network devices 112 may be capable of transmitting data, such as device status or other information about the operation of the device 112 to intelligent controller 104.

In operation, intelligent controller 104 calculates personal motion vectors of one or more wearable tags 102 based on position data received from one or more anchors 100. In some embodiments, the position data may include position coordinates and timestamps associated with those coordinates. The timestamp may represent a time at which the coordinates were detected by anchors 100. Intelligent controller 104 utilizes the calculated personal motion vectors, including in some embodiments the location, direction, and velocity, of wearable tags 102 to make intelligent decisions regarding the operation of one or more networked devices 112.

Intelligent controller 104 may transmit control instructions to networked devices 112 based on the personal motion vector of wearable tag 102, and the user preference profile associated with wearable tag 102, and/or other wearable tags 102. the user profile associated with wearable tag 102 may include preferences for actions with respect to selected networked devices 112 based on unique circumstances of the user, such as time of day, weather, or other preferences. For example, a user of wearable tag 102*a* may want dimmable lights 112 to be set to particular settings based on the time of day or the weather. As another example, the wearer of wearable tag 102*a* may be a household pet such that intelligent controller 104 may determine not to turn on the light at night based on the personal motion vectors of that wearable tag 102*a*. As another example, intelligent controller 104 may determine to leave the lights on upon wearable tag 102*a* leaving the room based on the continued presence of wearable tag 102*b* in the room.

Anchors 100 may be positioned within an indoor space such that the anchors 100 may capable of triangulating the location of wearable tags 102 within the space based on transmitted RF pulses from the anchors 100 and/or wearable tags 102. Anchors 100 may be positioned along the perimeter of one or more rooms of the interior space, or any other appropriate location effective to triangulate signals from wearable tag 102. In some embodiments, anchors 100 transmit RF pulses on regular intervals in order to measure the TDOA of signals reflected from wearable tags 102. The RF pulses may be UWB waveforms. In some embodiments, wearable tags 102 may also include the ability to respond to the transmitted RF pulses by modulating the transmitted RF pulse with a unique identifier of the wearable tag 102. Anchors 100 may analyze the modulated signals for the unique identity of the wearable tag 102, and may analyze the TDOA of the reflected signals to determine the location in three-dimensional space of wearable tags 102. Anchors 100 may be installed in various rooms of the house such that the personal motion vector of wearable tags 102 may be substantially continuously monitored as the wearer moves with the wearable tag 102 from room to room.

Intelligent controller 104 may be connected to the plurality of anchors 100 and networked devices 112. Intelligent controller 104 may be configured to receive positioning data of wearable tags 102 on periodic intervals. For example, intelligent controller 104 may receive, from one or more of anchors 100, a first position data corresponding to a first detection of the wearable tag 102*a*. Intelligent controller 104 may subsequently receive, from one or more of the other anchors 100, a second position data corresponding to the second detection of the wearable mobile RFID tag. The first and second position data may include the identity of wearable tag 102, the (x, y, and/or z) coordinates of wearable tag 102, and/or a time stamp associated with the time at which wearable tag 102 was located at the time the coordinates were detected. Based on the first and second position data, intelligent controller 104 calculates a personal motion vector of wearable tag 102 and associates the unique identity of wearable tag 102 with the vector. The personal motion vector may include the location, direction of travel, and velocity of wearable tag 102.

As intelligent controller 104 continues to receive position data from anchors 100, intelligent control hub may continuously update the personal motion vector of wearable tag 102. Intelligent controller 104 may also be capable of collecting multiple consecutive personal motion vectors into sets. Those sets may be pattern-matched against known gestures to determine whether user of wearable tag 102 is making a gesture intended as a form of control feedback to intelligent controller 104. Based on the personal motion vector, gesture, the identity of wearable tag 102, and/or one or more other selection criteria, intelligent controller 104 may select an operation with respect to one or more of networked devices 112. A control instruction effective to cause the networked device 112 to carry out the selected operation may be transmitted by intelligent controller 104 to the selected networked device 112. Intelligent controller 104 may execute a control algorithm to determine how the state of system 10 should be changed in response to the personal motion vectors of one or more wearable devices 102. Those decisions may be based on a preference profile associated with the unique identity of the wearable device 102. In accordance with the teachings of the present disclosure, intelligent controller 104 may interpret the same gesture differently based on the position at which the location where the gesture was detected. For example, rolling the wrist in the kitchen might be interpreted as a control instruction to turn down the stereo audio level in the kitchen, while the same gesture, when detected in the bedroom, may be interpreted as a control instruction to turn down the TV.

Intelligent controller 104 may adaptively update preference profile in any one or more of a number of ways. For example, intelligent controller 104 may update a preference profile based on calculating that a set of personal motion vectors represents a gesture indicating whether an action taken by intelligent controller 104 was within the personal preferences of the user of wearable device 102. Intelligent controller 104 may couple the gesture-based feedback with the circumstances under which the action was taken, such as the time of day, the time of year, the weather, and the presence of other wearable tags 102*b* in the vicinity of wearable tag 102*a*. This information may be used by intelligent controller 104 to update its predictive analysis engine and one or more preference profiles of wearable tags 102*a* and/or 102*b* in order to modify actions taken under similar circumstances in the future.

Intelligent controller 104 may also be capable of observing manual activities taken by the wearer of wearable tag 102 in a similar manner. For example, intelligent controller 104 may couple a manual operation of one or more networked devices 112 with a personal motion vector of wearable tag 102. Intelligent controller 104 may also utilize detected manual activities and motion vectors to dynamically build a map of where networked devices 112 are within the interior space. For example, intelligent controller 104 may determine that a light switch is at a particular x, y, z coordinate based on the consistent presence of a personal motion vector at that location when the controller 104 receives state change information that the switch is turned on or off. When multiple wearable tags 102 are located in system 10, intelligent control hub 112 may learn the location of various networked devices through a process of elimination of candidate locations based on the presence or absence of personal motion vectors at the same location over successive operations of the networked device 112. For example, if at a first time network device 112a is operated, wearable tag 102a is at location {1, 2, 10} and wearable tag 102b is located at {3, 5, 10}, intelligent controller 104 may designate those two locations as possible locations for network device 112a. If at a second time network device 112a is operated, wearable tag 102a is at location {1, 2, 10} and wearable tag 102b is located at {6, 11, 20}, then intelligent controller 104 may eliminate locations {3, 5, 10} and {6, 11, 20} as possible locations and select location {1, 2, 10} as the location of network device 112a.

In some embodiments, intelligent controller 104 may include a training mode where the location of various networked devices 112 and a corresponding virtual map may be generated by prompting a gesture at the location of each of the plurality of wall anchors. The virtual map training mode may include identifying a plurality of rooms for the virtual map. Each room in the map may be associated with particular preference profile settings for devices 112 within each room. The networked devices 112 may also be added to the map by the intelligent controller 104 prompting a gesture at each of the locations of networked devices 112 within system 10. The training mode may be executed by an interface application on UE 110, which may be utilized by intelligent controller 104 to prompt the various gestures to build the virtual map. In addition, an interface application on UE 110 can be used to complement, display, and update the virtual map in some embodiments using feedback from a user through the interface application.

Based on the map of networked devices 112 and personal motion vectors, intelligent controller 104 may begin to predictively control those devices. The predictive control of those devices by intelligent controller 104 may be further enhanced by detecting and recording the circumstances under which the personal motion vector associated with the control of a device 112 was detected. These detected circumstances may be recorded and used by intelligent controller 104 to update the predictive algorithms used to control networked devices 112. When similar circumstances are detected in the future, intelligent controller 104 may predictively operate the networked device 112 according to the predicted activity of the wearer based on its personal motion vector. For example, if a user of wearable tag 102 typically sets a dimmer switch 112 to a particular setting after entering a room at a particular time of day, day of the year, and/or season of the year, intelligent controller 104 may determine the location of dimmer switch 112 based on that activity. Additionally or alternatively, intelligent controller 104 may predictively begin setting the dimmer switch to that particular setting upon calculating a personal motion vector entering the room at that time of day.

As mentioned above, intelligent controller 104 may take actions with respect to networked devices 112 based on the presence of multiple wearable tags 102 in the same vicinity. Intelligent controller 104 may be capable of cross-correlating the preference profiles of wearable tags 102a and 102b to determine combined preference data when both tags are in the same vicinity and/or have similar movements. For example, intelligent controller 104 may have a first temperature setting that is preferred by the user of wearable tag 102a if wearable tag 102a is alone, but a second temperature setting that is preferred by the user of wearable tag 102b if wearable tag 102b is alone. Yet, if wearable tag 102a and wearable tag 102b are together in the same room, intelligent controller 104 may determine that a third temperature setting is preferred when the users of wearable tag 102a and 102b are together. Based on consistently selecting unique or different activities when wearable tag 102a and 102b are together from those that would be selected when wearable tags 102 are apart, intelligent control hub 102 may determine to generate a combined preference profile or special case within each user profile for using when the multiple wearable tags are together. Intelligent controller 104 may also select unique settings in group settings (such as get-togethers or parties) when the presence of multiple wearable tags 102 are detected within the same room.

Intelligent controller 104 may select operations of networked devices 112 based on predicted activities of wearable tags 102. For example, the predictive control algorithm of intelligent controller 104 may predict a first action to take with respect to a particular networked device 112, such as activating a light upon wearable tag 102 entering a room, or by activating a light of the room that wearable tag 102 is heading toward. The user of wearable tag 102 may provide feedback to intelligent controller 104 in the form of a gesture. Intelligent controller 104 utilizes position data from anchors 100 to detect a set of vectors calculated based on the gesture. Intelligent controller 104 may then match the set of patterns to a known gesture associated with a particular feedback value, such as an approve or disprove action command. Based on the feedback, intelligent controller 104 may update the preference profile of the user of wearable tag 102 based on the circumstances under which the gesture was made, such as the time of day, weather, presence of other tags 102, or any other appropriate circumstance. Based on the updated preference data, intelligent controller 104 may, utilizing its predictive analysis engine, more accurately predict the anticipated action of user of wearable 102 the next time similar circumstances and personal motion vector arise. Based on the updated preference data and under similar circumstances, intelligent controller 104 may take another action to control networked device 112. In some embodiments, intelligent controller 104 may scan for an additional gesture from wearable tag 102 to confirm that the user approves the second action. Alternatively, intelligent controller 104 may interpret a lack of a gesture from wearable tag 102 as an approval of the second action. Accordingly, the detection of an approve gesture or absence of a disapprove gesture may indicate the action was in accordance with user preferences.

Gestures may also be used to request intelligent controller 104 to perform a particular action with respect to system 10. For example, a particular gesture may be associated with activating a light switch 112 or adjusting the temperature of the thermostat 112. Upon detection of such a gesture, intelligent controller 104 may associate the gesture with the desired activity, and an appropriate operation command may be sent to the appropriate networked device 112.

Figure 2:
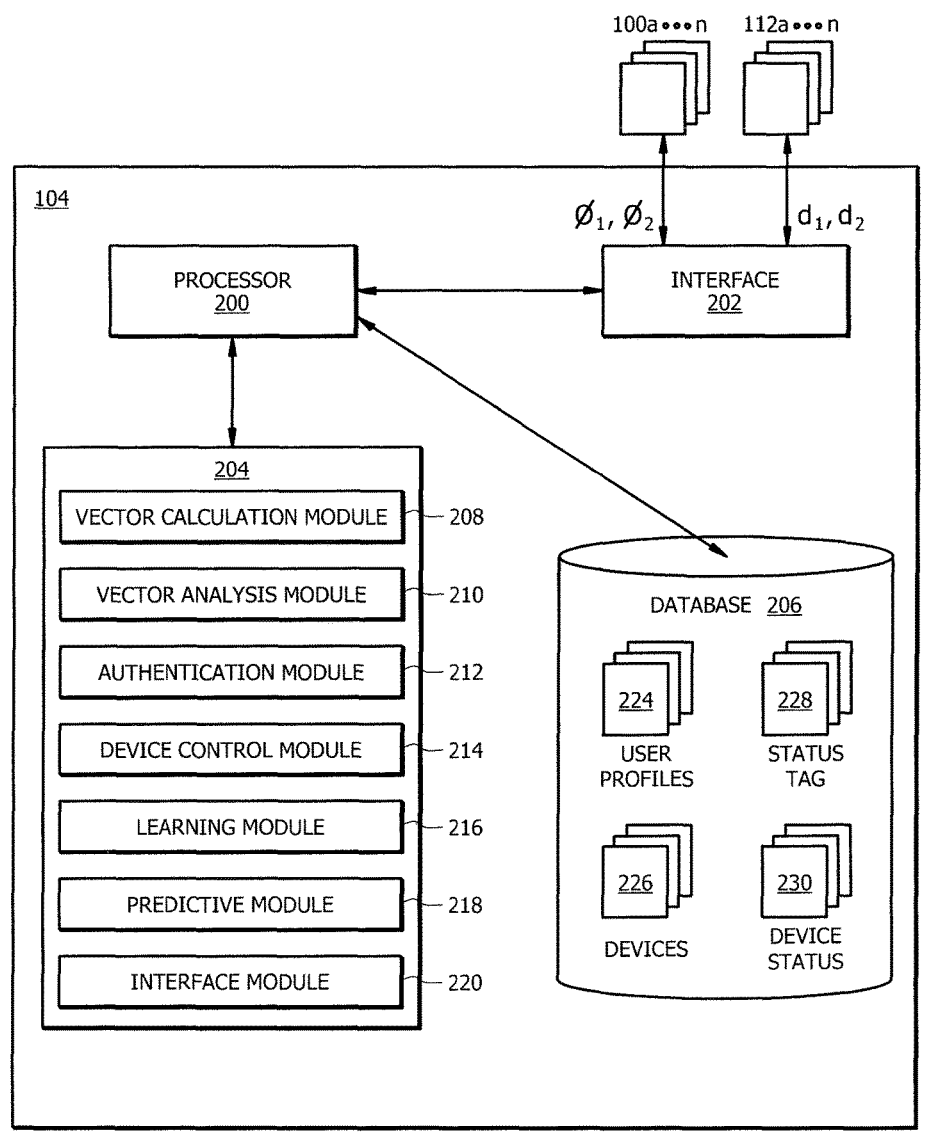
FIG. 2 is a block diagram illustrating an example embodiment of an intelligent controller in accordance with the teachings of the present disclosure.

FIG. 2 is a block diagram illustrating an example embodiment of an intelligent controller 104 in accordance with the teachings of the present disclosure. Intelligent controller 104 includes processor 200, interface 202, control algorithms 204, and database 206. Control algorithms 204 that may be executed by intelligent controller 104 include vector calculation module 208, vector analysis module 210, authentication module 212, device control module 214, learning module 216, predictive module 218, and interface module 220. Database 206 may store the state of various elements within system 10, including user profiles 222, configured devices 224, the status of various wearable tags 226, and the status of various devices 228. In operation, intelligent control hub receives various position data (depicted as $\emptyset_1$, $\emptyset_2$) from anchors 100a . . . n, and may utilize the various control algorithms 204 to calculate personal motion vectors of wearable tags 102 and utilize those vectors for generating control outputs (depicted as $d_1$, $d_2$) to various networked devices 112a . . . n. Intelligent controller 104 may also include interface module 220 containing logic for interacting with an interface application executed by UE 108.

Processor 200 comprises a combination of hardware, software, and computer components appropriate for executing control algorithms 204 based on position information $\emptyset_1, \emptyset_2 \ldots \emptyset_N$ received from anchors 100 via interface 202, information stored in database 206, and/or information received from networked devices 112 (such as device status, sensor information or configuration information). The execution of control algorithms 204 may cause processor 200 to select one or more of network devices 112 and issue one or more control instructions $d_1, d_2 \ldots d_N$ to the selected networked devices 112. Processor 200 may represent all or a portion of a programmable logic controller, application specific integrated circuit (ASIC), field-programmable gate array (FPGA), or other suitable computer processor.

Interface 202 comprises an interface module suitable for transmitting information to and receiving information from anchors 100, UE 108, and/or networked devices 112 via a communication network 108. Interface 202 may represent a network interface card (NIC), Ethernet card, port ASIC, Wi-Fi or other wireless module, or a module for communicating according to any suitable wired and/or wireless communication protocol. In some embodiments, interface 202 may represent multiple interface cards that are able to transmitting and receiving information according to any number and combination of communication protocols necessary for communicating with anchors 100, networked devices 112, or UE 108.

Vector calculation module 208 comprises a module containing hardware, software, and/or appropriate logic to execute an algorithm for determining a personal motion vector of one or more wearable tags 102 based on position data $\emptyset_1, \emptyset_2 \ldots \emptyset_N$ received from anchors 100. For example, vector calculation module 208 may make appropriate calculations to determine where wearable tag 102 is, what direction and with what velocity wearable tag 102 is moving in relation to a virtual map of the home or indoor space. For example, vector calculation module 208 may utilize the calculations discussed above with respect to FIG. 1 to calculate a sequence of personal motion vectors for each of the wearable tags 102 (e.g., wearable tag 102a, 102b) within system 10.

Vector analysis module 210 comprises a module containing hardware, software, and/or appropriate logic to execute an algorithm for analyzing personal motion vectors calculated by vector calculation module 208. For example, vector analysis module 210 may perform further calculations to detect patterns of vectors generated by a wearable tag 102 and to determine that wearable tag 102 is being used by the wearer to make a particular gesture. Vector analysis module 210 may continuously or semi-persistently analyze all or a subset of the vectors generated in order to compare the sets of vectors generated by vector calculation module 208 to a table or database within database 206 of known patterns of vectors that should be interpreted and/or associated with a gesture. Database 206 may store gestures and their associated sets of vectors within user profiles 224 or other appropriate location. Gestures may be unique to a particular wearable tag 102a and/or may be associated with any number of wearable tags 102.

It should be noted that while vector calculation module 208 and vector analysis module 210 are depicted in the illustrated embodiment as being part of intelligent controller 104, they may be implemented in any appropriate location within system 10. For example, in an example embodiment, vector calculation module 208 and/or vector analysis module 210 may form a portion of anchors 100. In such an embodiment, anchors 100 may transmit personal motion vectors and/or detected gestures to intelligent controller 104 for further analysis.

Authentication module 212 comprises a module containing hardware, software, and/or appropriate logic to execute appropriate user authentication and/or authorization functions within system 10. For example, authentication module 212 may be utilized to determine whether a particular UE 108 may access intelligent control hub 204 to configure devices 112, change preferences of particular user profiles 224, or change parental control settings associated with particular device profiles 226. Authentication module 212 may also be utilized to determine whether a particular wearable tag 102 is authorized to take a particular action within system 10. For example, vector analysis module 210 may determine whether wearable tag 102 is authorized to operate a particular device 112 for which parental or other controls have limited the control of that device to particular users or groups of users. Authentication module 212 may access a user profile 224 in order to determine the user's authorization level before allowing a particular device 112 to be controlled by wearable tag 102. For example, a parent with administrative control of all user profiles may restrict access to particular devices 112 based on time of day or other appropriate circumstances.

Device control module 214 comprises a module containing hardware, software, and/or appropriate logic to transmit control instructions $d_1, d_2 \ldots d_N$ to networked devices 112 in response to instructions received from predictive module 218 and/or UE 108. Device control module 214 may store device instructions for each networked device 112 operable to cause each network device 112 to operate according to its intended purpose. For example, device control module 214 may include instructions for operating remote camera monitors, security systems, windows and door locks, lighting systems, thermostats, or other networked devices 112. Device control module 214 may also include logic for receiving status information from remote devices, and may be capable of maintaining device status tables 230 within database 206. For example, device control module 214 may control and/or maintain the state of system 10 and its associated networked devices 112 by updating device entries within device status tables 230.

Learning module 216 comprises a module containing hardware, software, and/or appropriate logic to execute an algorithm for learning the activities that are to be taken based on the personal motion vector of each wearable tag 102. Learning module 216 may also include a training algorithm for learning the layout of devices 112 within the home or indoor space.

Learning module 216 may include logic for learning the preferences of the user of wearable tag 102, which can be obtained in a number of different ways in accordance with the teachings of the present disclosure. For example, learning module 112 may monitor the status of networked devices 112 and correlate device status changes with the personal motion vectors of wearable tag 102. To illustrate, learning module 216 may detect the presence of wearable tag 102 in the vicinity of networked device 112, and based on a state change of device 112 from a first state to a second state at or near a time at which wearable device 102 is moving to networked device or is at network device 112, learning module 216 may determine that wearable device 112 has effected the state change. Learning module 216 may record and/or store various circumstances associated with the operation in user profile 224. Learning module 216 may then correlate those circumstances with actions that should be taken to modify the state of system 10 in future similar circumstances. In this way, learning module 216 may build and update a profile of user preferences for the operation of networked devices 112 by wearable tag 102.

As another example, upon the execution of a particular action with respect to networked device 112 caused by device control module 214, learning module 216 may receive feedback in the form of a gesture calculated by vector analysis module 210. That gesture may indicate that the action was, for example, correct, incorrect and/or undesired. Learning module 216 may then obtain and store the circumstances associated with that feedback in order to update a user profile 224 associated with wearable tag 102. For example, learning module 216 may store the time of day, personal motion vectors of other wearable tags 102, or other suitable circumstances. These circumstances may for example, be stored in one or more user profiles 224, which are used by predictive module 218 to determine particular actions that are to be taken by device control module 218 in response to the detection of a personal motion vector of wearable tag 102.

Predictive module 218 comprises a module containing hardware, software, and/or appropriate logic to execute a predictive control algorithm for networked devices 112 based on the personal motion vectors of one or more wearable devices 102. Predictive module 218 may contain logic for considering any number of appropriate factors in conjunction with personal motion vectors to predictively control the elements of system 10. For example, predictive module 218 may access user profile 224 of wearable tag 102 in response to detecting the personal motion vector of wearable tag 102. If the personal motion vector is associated with a predicted or desired activity of the user with respect to a particular networked device 112 (such as turning on the lights in the room to which wearable tag 102 is headed), and the circumstances are present under which that activity and personal motion vector are correlated, then predictive module 218 may instruct device control module 218 to transmit an appropriate instruction to effect that activity on the networked device 112. As learning module 216 continues to update user profiles 224, predictive module 218 may more accurately predict appropriate activities of networked devices 112 in response to personal motion vectors of wearable tags 102.

Interface module 220 comprises a module containing hardware, software, and appropriate logic to interact with a remote application operating on UE 108. This interface can be used such that a user of UE 108 may interact with a graphical user interface application, such as a smart phone app, to control networked devices 112. For example, in response to a control instruction from UE 108 to operate a particular device 112, interface module 220 may relay that instruction to device control module 214. Interface module 220 may also include logic for displaying the status 230 of devices 226 to UE 108. For example, the UE 108 may access and control settings on a networked thermostat or may view and control a camera device within system 10 via an interface residing on UE 108. Interface module 220 may be utilized to assist in providing the location of various networked devices 112 within the indoor space and/or may be used to assist in generating a virtual map of the indoor space using map building tools on the interface application of UE 108. Interface module 220 may also be configured to receive an initial set of user preferences for the operation of devices 112 from UE 108.

In operation, intelligent control hub 204 and its various control algorithms 204 operate the various networked devices 112 in response to personal motion vectors of wearable tags 102 calculated by vector calculation module 208. When system 10 is initialized or from time to time during the system's operation, a user of UE 108 may set up an initial user profile via interface module 220. This may include setting up user preferences for networked devices 112 operation in response to personal motion vectors and other circumstances associated with that activity in the indoor space. The devices configured to be utilized in system 10 may be stored in devices 226.

Intelligent control hub 204 may execute learning module 216 to learn the preferences of the user of wearable tag 102 as the various devices are operated within system 10. Alternatively or additionally, interface module 220 may receive an initial set of preferences and/or updated preferences from UE 108. Those preferences may be stored in user profiles 224. As the status of devices 230 changes, learning module 216 may associate personal motion vectors with the status changes and the circumstances of those changes. Based on particular circumstances of the device changes, learning module 216 may update the user profile, such that predictive module 218 may utilize that information to predictively operate devices 112 based on the detection of the personal motion vectors associated with those status changes.

Vector analysis module 210 may detect a set of personal motion vectors associated with wearable tag 102 and determine that the set of personal motion vectors comprises a gesture. Vector analysis module 210 may store incoming personal motion vectors calculated by vector calculation module 208 and analyze the personal motion vectors to look for a correlation with known sets of personal motion vectors that are associated with gestures of wearable tag 102. Additional detail including example embodiments for how this may be accomplished is described below with respect to FIG. 4.

The gestures detected by vector analysis module 210 may be associated with various control operations of intelligent controller 104. For example, a particular gesture may be interpreted as a control instruction turn on the light or to raise or lower the temperature. As learning module 216 updates user profile 224 based on these gestures, predictive module 218 may utilize the prior gesture-based control to determine when to perform a particular control activity of networked devices 112.

Several scenarios enabled by the teachings of the present disclosure are now discussed. In an example embodiment of operation, a user of wearable tag 102 may enter a room and the lights may be activated by device control module 102. Because vector calculation module 208 continues to track the location of wearable tag 102, predictive module 218 leaves the lights activated while the user remains in the room according to user profile 224. User of wearable tag 102 may wish to dim the lights when a television is turned on in the room. A gesture detected by vector analysis module 210 may be used to instruct intelligent controller 104 to dim the lights. Learning module 216 stores the circumstances of the interaction with intelligent controller 104 in user profile 224, including that the device status of television changed at a time at or near the instruction to dim the lights. The next time that user of wearable tag 104 turns on the television within the room, predictive module 218 may, based on the updated information in user profile 224, detect that the television is turned on and that user of wearable tag 104 previously dimmed the lights under that circumstance. Predictive module 218 may, in response to detecting the updated user preference and personal motion vector of wearable tag 102, determine to dim the lights by sending an appropriate instruction via device control module 214.

As another example embodiment of operation, learning module 216 may detect that wearable tag 102 typically dims the lights at a particular time of day based on the presence of wearable tag 102 at the light switch and obtaining an updated device status at or near that time. Learning module may then update user profile 224 accordingly. Predictive module 218 may responsively begin lowering the lights based on the time of day.

As another example, the presence of more than one wearable tag 102 may influence the operation of intelligent controller 104. For example, predictive module 104 may utilize user profile 224a of wearable tag 102a to turn off the lights immediately when that wearable tag 102a leaves the room. If, however, wearable tag 102b remains in the room, predictive module 104 will not turn off the lights when wearable tag 102a leaves the room. As another example, intelligent control module 104 may detect that wearable tag 102a is moving towards the bathroom in the middle of the night, and that wearable tag 102b remains in bed. Under those circumstances intelligent controller 104 may activate a night light or path light and not the main light in the room. As another example, intelligent controller 104 may be capable of storing joint preferences between users of multiple wearable tags 102, such as wearable tags 102a and 102b. For example, if wearable tag 102a is alone in the home, a temperature setting preference may be 68 degrees, while if wearable tag 102b is alone in the home, the temperature setting preference may be 72 degrees. If both wearable tag 102a and wearable tag 102b are together, however, the joint temperature preference might be 70 degrees. In another example where the wearer of tag 102 may be a household pet, intelligent controller 104 may activate an outdoor light in response to detecting that the pet is moving through the doggy door.

Using the improved home automation technology of the present disclosure, additional, previously unavailable use cases may also be created. For example, the garage door may automatically lower when the wearer of wearable tag 102 leaves the garage and enters the kitchen. Intelligent controller 104 may trigger energy saver modes in real-time as occupants move throughout the home. Intelligent control hub may activate the home alarm system upon detecting that all users of wearable tags 102 have left the home. It should be understood that the present disclosure is not limited to these examples, but are merely provided to illustrate use cases of the improved feedback and control mechanisms provided by the present disclosure.

Figure 3:
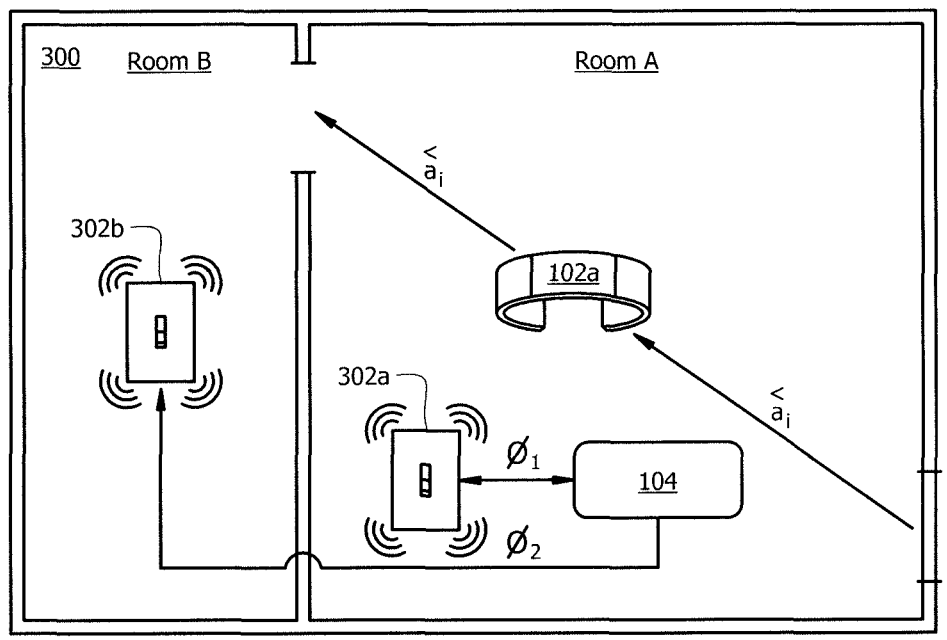
FIG. 3 is a block diagram illustrating an example embodiment of a control operation in a system for home automation in accordance with the teachings of the present disclosure.

FIG. 3 is a block diagram illustrating an example embodiment of a control operation in a system 10 for home automation in accordance with the teachings of the present disclosure. As mentioned above, intelligent controller 104, when enabled with the personal motion vectors of wearable tags 102, may now take into account not only the location of wearable tag 102, but also take into account the direction and velocity of wearable tag 102. Intelligent control hub may obtain position data of wearable tag 102 in the manner discussed above with respect to FIGS. 1 and 2 and use it to calculate personal motion vector $\vec{a}$ of wearable tag 102. Based on user profile 224, personal motion vector $\vec{a}$, and the time of day, intelligent controller 104 may determine that based on a time of day being night time and past activities of wearable tag 102, that the user of wearable tag 102a does not want light 302a to be activated while traveling through Room A. However, intelligent controller 104 may predict that wearable tag does want light 302b to be activated in Room B. Intelligent controller 104 may predictively activate light 302b at a time at or before wearable tag 102b is expected to arrive at Room B based on the personal motion vector $\vec{a}$. This activity of intelligent controller 104 may be learned based off the previously-detected gestures of wearable tag 102a in similar circumstances. For example, if wearable tag 102 goes to the kitchen from the bedroom at night, wearable tag might "wave off" turning on the lights in between the bedroom and the kitchen, but "wave on" turning on the lights in the kitchen. It should be understood that while FIG. 3 is intended to demonstrate one advantageous embodiment of operation of intelligent controller 104, it is not intended to limit the scope of the present disclosure in any way.

FIGS. 4A and 4B are perspective drawings illustrating example gestures for home automation control in accordance with the teachings of the present disclosure. FIG. 4A illustrates how a gesture $G_1$ may be detected from a set of personal motion vectors $\vec{b}_1 \ldots \vec{b}_6$. In particular, as the wearer of wearable tag 102 rotates his or her hand according to gesture $G_1$, anchors 100 may transmit position data comprising the three-dimensional coordinates of wearable tag 102 to intelligent controller 104. Vector calculation module 208 may resolve these coordinates into a series of personal motion vectors $\vec{b}_1 \ldots \vec{b}_6$ and pass them to vector analysis module 210 for further analysis. Vector analysis module 210 may then examine the vectors $\vec{b}_1 \ldots \vec{b}_6$ as they are received in order to correlate them to known patterns of vectors comprising various gestures configured for use in controlling various aspects of system 10. Based on correlating vectors $\vec{b}_1 \ldots \vec{b}_6$ to a set of known vectors associated with gesture $G_1$, vector analysis module 210 may determine that the user of wearable tag 102 is making gesture $G_1$. It should be noted that vector analysis module 210 may be configured to examine personal motion vectors in real-time in order to identify the subset of vectors $\vec{b}_1 \ldots \vec{b}_6$ comprising gesture from the overall sequence of vectors being generated by vector calculation module 208 corresponding to the movements of wearable tag 102. For example, personal motion vectors may be stored in a FIFO buffer or other suitable data structure that is analyzed for matching gestures each time a new personal motion vector is added to the buffer and an old personal motion vector is removed.

FIG. 4B illustrates how a gesture $G_2$ may be detected from a set of personal motion vectors $\vec{b}_7$ and $\vec{b}_8$. In particular, as the wearer of wearable tag 102 moves his or her hand up and down according to gesture $G_2$, intelligent controller 104 may detect gesture $G_2$ in a similar manner as discussed above with respect to G1 in FIG. 4A. An example embodiment of the use of a FIFO buffer 400 to examine sets of personal motion vectors $\vec{b}_0 \ldots \vec{b}_8$ for gestures such as gestures $G_1$ or $G_2$ is illustrated in FIG. 4C. It should be noted, however, that FIGS. 4A to 4C are only intended as examples and that the teachings of the present disclosure are intended to encompass any number and types of gestures that may be made with wearable tag 102 and detected by intelligent controller 104.

Figure 5:
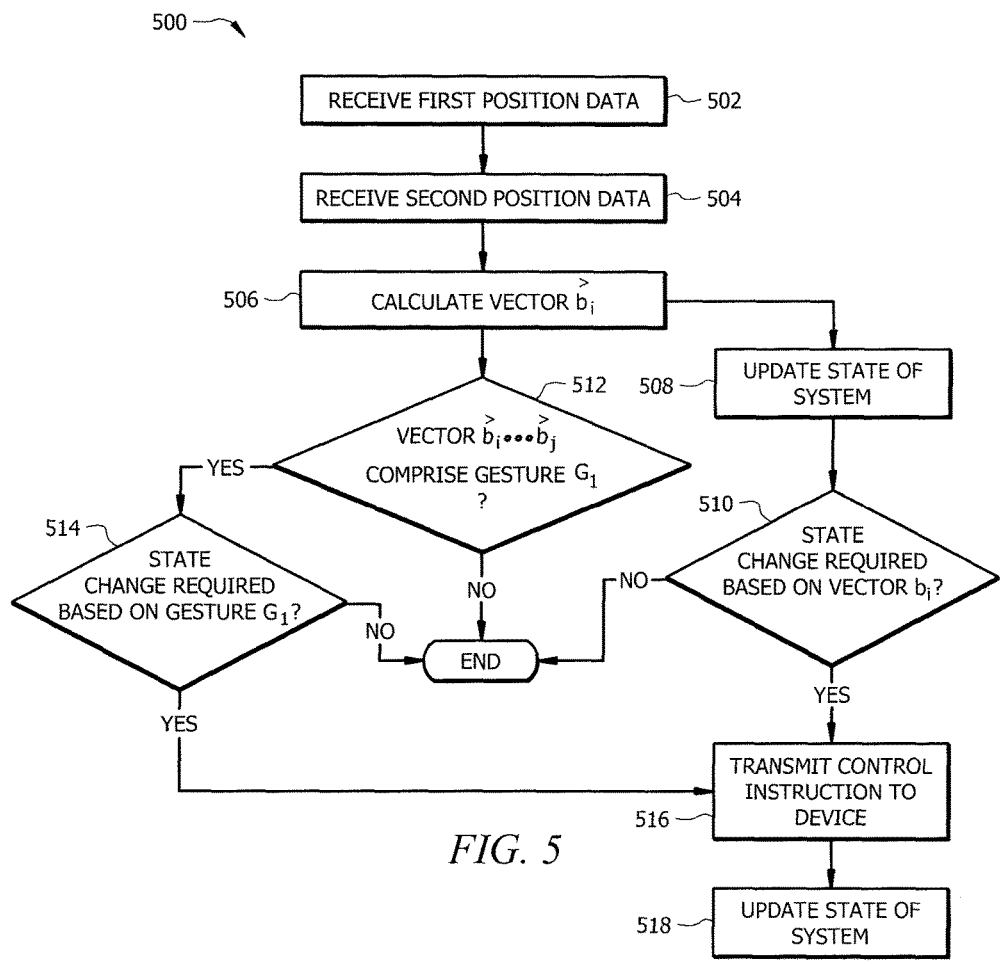
FIG. 5 is a flowchart illustrating an example embodiment of a method for home automation in accordance with the teachings of the present disclosure.

FIG. 5 is a flowchart illustrating an example embodiment of a method 500 for home automation in accordance with the teachings of the present disclosure. At steps 502 and 504, intelligent controller 104 receives first and second position data from anchors 100. Steps 502 and 504 may comprise part of a continuous or semi-persistent stream of position data that updates the position data of wearable tag 102 in real-time. This may include sub-second sampling of the location of wearable tag 102 by anchors 100 where the position data of wearable tag 102 is updated on a 100 millisecond (ms) basis. In some embodiments, the position data of wearable tag 102 may be updated every 100 to 500 ms. It should be noted however, that the update period may be lengthened, such as to updating once every 1000 ms to 2000 ms, to the extent that the wearable tag 102 enters a DRX mode based on a detection that wearable tag 102 is stationary and/or has consistent position coordinates. At step 506, intelligent controller 104 calculates a personal motion vector associated with wearable tag 102. This calculation may also be performed continuously or semi-persistently at the same or different rate of repetition of the receipt of position data in steps 502 and 504. Steps 502 through 506 may be performed in parallel with any other wearable tags 102 in the indoor space.

At step 508, intelligent controller 104 updates the state of system 10, including updating the location of wearable tags 102 in the indoor space. Step 508 may include receiving any status updates from networked devices 112 (such as indoor or outdoor temperature, status of any window or door sensors, and any status changes of door lock or lights). At step 510, intelligent controller 104 determines if any status changes are required based on the personal motion vector of wearable tag 102. This decision may include selecting any devices for which state changes are desired based on personal motion vector of wearable tag 102 and other information associated with the state of system 10. For example, in selecting a device 112 to control, intelligent controller 104 may take into account factors such as time of day, time of year, indoor or outdoor temperature along with the personal preferences of the user of wearable tag 102. The selection may be based on a prediction of the personal preference of the user of wearable tag 102 based on a user profile and/or observation of past activities of wearable tag 102 within system 10. For example, the selection may be made by predictive module 218 based on information obtained by learning module 216 as described above with respect to FIG. 2.

At step 514, intelligent controller 104 may be configured to detect whether a recent sequence of personal motion vectors associated with wearable tag 102 contain any known sequence that corresponds to a gesture. If that is the case, the method next determines at step 514 whether the gesture corresponds to a state change request to system 10. For example, if intelligent controller 104 has recently made a change to system 10 based on the personal motion vector of wearable tag 102, such as is described above with respect to step 510, a gesture may be detected shortly after that comprises an instruction that a different operation of networked device 112 is desired by user of wearable tag 102. For example, the gesture may comprise an instruction to turn the lights back on, or to change the dimmer settings on the lights in the room. Additionally or alternatively, the gesture may be an instruction to perform a control operation without respect to the prior activity of intelligent controller 104. For example, a particular gesture could be used by intelligent controller 104 as an instruction to change temperature settings, set the alarm system, or lock the doors or windows.

After any selected network devices 112 receive their appropriate control instructions at step 516, intelligent controller 104 updates the state of system 10 accordingly. This step may include updating the status of the networked devices 112 within system 10, and may include updating the user profile of wearable tag 102 to reflect any additional preferences learned by the recent activities of wearable tag 102 with respect to system 10. For example, learning module 216 may record circumstances regarding the change of state to system 10 as described above with respect to FIG. 2.

Modifications, additions, or omissions may be made to method 500 illustrated in the flowchart of FIG. 5. For example, method 500 may include any of the functionality as described above with respect to FIGS. 1 through 4 or below with respect to FIG. 6. Accordingly, the steps of FIG. 5 may be performed in parallel or in any suitable order.

Figure 6:
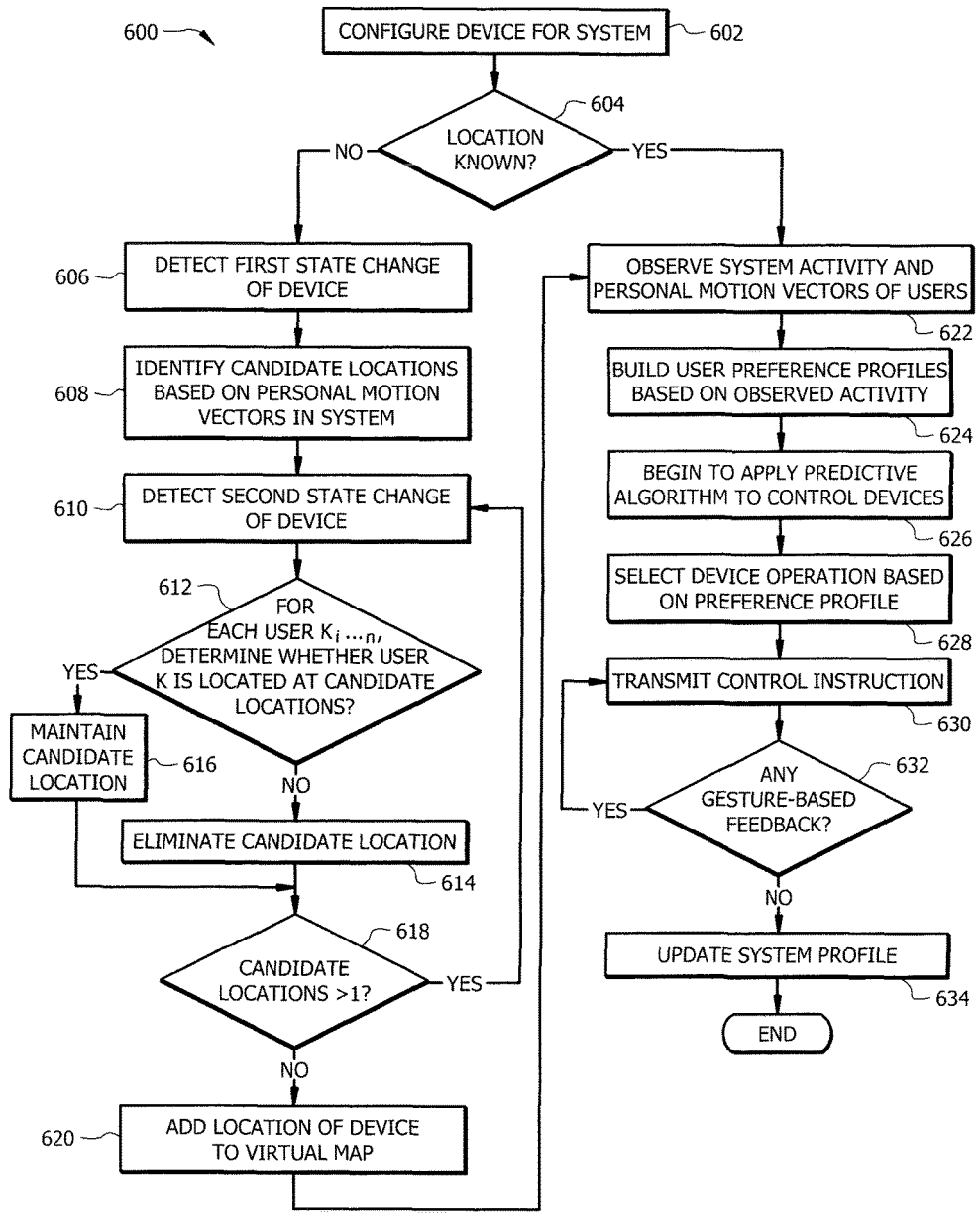
FIG. 6 is a flowchart illustrating an example embodiment of a method for configuring a home automation system with adaptive learning module.

FIG. 6 is a flowchart illustrating an example embodiment of a method for configuring a home automation system 10 with an adaptive learning module (such as learning module 216). At step 602, one or more networked devices 112 are configured to be used within system 10. This may include performing any device setup, installation, and configuration necessary to set up a connection between intelligent control hub and networked devices 112. The location of the devices 112 may be manually provided to intelligent controller 104 within a virtual map, or may be learned by intelligent controller 104 by observing the activities and personal motion vectors of the various wearable tags 102 in system 10. If, at step 604, the location of the one or more configured network devices 112 is known to intelligent controller 104, the method 600 proceeds to step 622.

If, however, the location of the one or more networked devices 112 is not known, then the method 600 proceeds to step 606. At step 606, intelligent control module 104 begins to observe the status changes of device settings associated with the networked devices 112 in order to learn their location. At step 606, intelligent control hub may detect a first state change of the one or more networked devices 112. For example, the status indicating whether a light switch is activated or not may change from an active state to an inactive state. This activity may cause device status information to be updated within intelligent controller 104. Upon a detection of such a state change, intelligent control hub may at step 608 calculate the location of the wearable tags 102 based on the position data from anchors 100 and/or the personal motion vectors of the various wearable tags 102 within system 10, on the assumption that one of the wearable tags 102 is responsible for the state change and is located at or near the networked device 112 whose state has changed. Based on the location of the various wearable tags 102, intelligent controller 104 identifies candidate locations for the one or more networked devices 112. If only one candidate location is identified, the system may proceed to step 620, otherwise method 600 proceeds to step 610.

If there are multiple candidate locations for the one or more networked devices 112, intelligent controller 104 may detect a second state change of the one or more networked devices. Then, at step 612, intelligent controller 104 may determine the locations of wearable tags 102 within system 10. For each user k=i to n within the system, intelligent controller 104 determines if their wearable tags 102 are located at or near one of the candidate locations determined at step 608. If no wearable tags 102 are located at one of the candidate locations after the second state change, that candidate location is eliminated at step 614. If a wearable tag 102 is located at one of the candidate locations, that location is maintained as a possible location of networked device 112 at step 616. At step 618, if the number of candidate locations for the one or more networked devices is still greater than one, method 600 may return to step 610 to detect another state change of the system and continue eliminating candidate locations in steps 612 and 614 until the candidate locations is not greater than one. Once the number of candidate locations falls to one, the method proceeds to step 620 and the location of the one or more networked devices 112 is added to a virtual map of system 10.

The method may then proceed to step 622, where intelligent controller 104 may apply an adaptive learning algorithm to observations of system 10 operation by users of wearable tags 102 and their associated personal motion vectors. For example, intelligent controller 104 may apply the functionality of learning module 216 as discussed above with respect to FIG. 2. As intelligent control module 104 learns the behaviors of the users of system 10, intelligent control module 104 builds user preference profiles at step 626. At step 628, intelligent control module 104 may begin applying a predictive algorithm in response to detecting the personal motion vectors of wearable tags 102, such as the functionality of predictive module 218 as discussed above with respect to FIG. 2. Intelligent controller 104 may apply the predictive algorithm and information learned by learning module 216 as stored by the user preference profiles to select network devices 112 and operations of those devices in response to detecting particular personal motion vectors of wearable tags 102. For example, if intelligent controller 104 repeatedly observes a particular activity of wearable tag 102 at particular times of the day, or repeatedly observes different activities when wearable tag 102 is in the presence of other wearable tags 102, intelligent controller 104 may begin to predictively control the operation of networked devices 112 involved in those activities upon a detection of a personal motion vector and user profile preferences that match the circumstances of the prior observed behavior.

After selecting an appropriate networked device 112 and control operation, intelligent controller 104 may at step 630 send an appropriate control instruction to the selected network device 112. At step 632, intelligent controller 104 may detect whether any gesture-based feedback has been provided by the user of wearable tag 102. If so, intelligent controller 104 may return to step 630 to transmit any new or corrective instructions to networked device 112. If no gesture-based feedback is detected, the method continues to step 634 where the status of system 10 is updated based on the recent activities of intelligent controller 104, devices 112, and wearable tags 102.

Modifications, additions, or omissions may be made to method 600 illustrated in the flowchart of FIG. 6. For example, method 600 may include any of the functionality as described above with respect to FIGS. 1 through 5. For example, a particular personal motion vector may cause intelligent controller 104 to control any number and combination of networked devices 112 or to transmit multiple instructions to a single networked device 112 (or some combination of the foregoing). Accordingly, the steps of FIG. 6 may be performed in parallel or in any suitable order.

Technical advantages of certain embodiments of the present invention include an improved control system that can detect and take into account the personal motion vectors of wearable tags when making control decisions. By improving the feedback and control mechanisms of the home automation system 10 itself, including improving the technology within intelligent controller 104, various other benefits can be achieved. Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

The invention claimed is:

1. A system for indoor position and vector tracking, comprising:
 a plurality of anchors positioned in an indoor space, the plurality of anchors comprising a plurality of radio frequency transmitters each operable to transmit a radio frequency (RF) waveform;
 a wearable mobile radio frequency identification (RFID) tag responsive to the RF waveform;
 an intelligent controller connected to the plurality of anchors and at least one networked device, the intelligent controller comprising control logic implemented in a computer-readable medium and operable to:
  receive, from at least one of the plurality of anchors, a first position data corresponding to a first detection of the wearable mobile RFID tag;
  receive, from at least one of the plurality of anchors, a second position data corresponding to the second detection of the wearable mobile RFID tag;
  calculate, from the first position data and the second position data, a personal motion vector of the mobile RFID tag, the personal motion vector representing at least one of (1) a location and direction of movement or (2) a gesture of the mobile RFID tag;
  associate the wearable RFID tag with a unique identity;
  select an operation with respect to the at least one networked device based at least on the personal motion vector and the unique identity; and
  transmit a control instruction to the at least one networked device operable to cause the selected operation on the at least one networked device.

2. The system of claim 1, wherein the selection is further based on preference profile associated with the unique identity.

3. The system of claim 1, wherein the selection is further based on a prediction of a control activity of the at least one networked device by the wearer of the wearable mobile RFID tag.

4. The system of claim 1, wherein the selection is further based on obtaining a plurality of personal motion vectors associated with a plurality of wearable mobile RFID tags and determining a selected operation based on an identity of the plurality of wearable mobile RFID tags within the indoor space.

5. The system of claim 1, wherein the selection is further based on determining a preference for the operation of the networked device, the preference based on at least one of time of day, time of year, outside temperature, and a number and identity of wearable mobile RFID tags present in the indoor space.

6. The system of claim 1, wherein the selection is further based on correlating the personal motion vector with a time of day and a preferred operation of the networked device at the time of day.

7. The system of claim 1, wherein the personal motion vector is one of a sequence of personal motion vectors corresponding to a gesture and the selection is based on correlating the gesture with a selectable operation of the networked device.

8. The system of claim 1, wherein the selection is further based on correlating a plurality of preference profiles and calculating at least two personal motion vectors within the indoor space.

9. A method for indoor position and vector tracking, comprising:
 receiving, by an intelligent controller, a first position data from at least one of a plurality of anchors positioned in an indoor space, wherein the plurality of anchors comprise a plurality of radio frequency transmitters each operable to transmit an RF waveform and the first position data corresponds to a first detection of a wearable mobile radio frequency identification (RFID) tag using the RF waveform;
 receiving, by the intelligent controller, a second position data from at least one of the plurality of anchors, wherein the second position data corresponds to the second detection of the wearable mobile RFID tag;
 calculating, from the first position data and the second position data, a personal motion vector of the mobile RFID tag, the personal motion vector representing at least one of (1) a location and direction of movement or (2) a gesture of the mobile RFID tag;
 associating the wearable RFID tag with a unique identity;
 selecting an operation with respect to the at least one networked device based at least on the personal motion vector and the unique identity; and
 transmitting a control instruction to the at least one networked device operable to cause the selected operation on the at least one networked device.

10. The method of claim 9, wherein the selection is further based on preference profile associated with the unique identity.

11. The method of claim 9, wherein the selection is further based on a prediction of a control activity of the at least one networked device by the wearer of the wearable mobile RFID tag.

12. The method of claim 9, wherein the selection is further based on obtaining a plurality of personal motion vectors associated with a plurality of wearable mobile RFID tags and determining a selected operation based on an identity of the plurality of wearable mobile RFID tags within the indoor space.

13. The method of claim 9, wherein the personal motion vector is one of a sequence of personal motion vectors corresponding to a gesture and the selection is based on correlating the gesture with a selectable operation of the networked device.

14. An apparatus for indoor position and vector tracking, comprising:
 a network interface controller (NIC) that is connectable to a plurality of anchors, wherein the plurality of anchors comprise a plurality of radio frequency transmitters each operable to transmit an RF waveform and detect a wearable mobile radio frequency identification (RFID) tag using the RF waveform, the interface operable to:
  receive, from at least one of the plurality of anchors, a first position data corresponding to a first detection of the wearable mobile RFID tag;
  receive, from at least one of the plurality of anchors, a second position data corresponding to the second detection of the wearable mobile RFID tag;
 a vector calculation module operable to receive the first and second position data from the NIC and calculate, from the first position data and the second position data, a personal motion vector of the mobile RFID tag, the personal motion vector representing at least one of (1) a location and direction of movement or (2) a gesture of the mobile RFID tag;
 a control module operable to:
  associate the wearable RFID tag with a unique identity;
  select an operation with respect to the at least one networked device based at least on the personal motion vector and the unique identity; and
  transmit, to the NIC, a control instruction for at least one networked device, the NIC further operable to transmit the control instruction to the at least one networked device and cause the selected operation on the at least one networked device.

15. The apparatus of claim 14, wherein the selection is further based on preference profile associated with the unique identity.

16. The apparatus of claim 14, wherein the selection is further based on obtaining a plurality of personal motion vectors associated with a plurality of wearable mobile RFID tags and determining a selected operation based on an identity of the plurality of wearable mobile RFID tags within the indoor space.

17. The apparatus of claim 14, wherein the personal motion vector is one of a sequence of personal motion vectors corresponding to a gesture and the selection is based on correlating the gesture with a selectable operation of the networked device.

18. The apparatus of claim 14, wherein the selection is further based on correlating a plurality of preference profiles and calculating at least two personal motion vectors within the indoor space.

19. The apparatus of claim 14, further comprising a predictive control module operable to apply a predictive algorithm that selects the operation with respect to the at least one networked device based on predicting an activity of the wearer of mobile RFID tag based on the personal motion vector.

20. The apparatus of claim 14, wherein the selection is further based on determining a preference for the operation of the networked device, the preference based on at least one of time of day, time of year, outside temperature, and a number and identity of wearable mobile RFID tags present in the indoor space.

* * * * *